Oct. 4, 1966 T. E. FAIRBAIRN 3,277,243

TELEPHONE ADAPTER

Filed Dec. 19, 1962 2 Sheets-Sheet 1

INVENTOR.
THOMAS E. FAIRBAIRN

BY B. J. Barish

ATTORNEY

INVENTOR.
THOMAS E. FAIRBAIRN
BY
ATTORNEY

United States Patent Office 3,277,243

Patented Oct. 4, 1966

3,277,243
TELEPHONE ADAPTER

Thomas E. Fairbairn, Galion, Ohio, assignor to Burroughs Corporation, Detroit, Mich., a corporation of Michigan Filed Dec. 19, 1962, Ser. No. 245,760
3 Claims. (Cl. 179—81)

This invention relates to a telephone adapter for connecting an external electrical device to a telephone line, and particularly to a telephone adapter attachable to one of the sound transducer assemblies (e.g., the transmitter assembly) of a standard telephone handset for selectively coupling the telephone to an external electrical device.

As a preferred embodiment, the invention is herein described with respect to an adapter for use in coupling communication equipment, particularly a facsimile transmitter and/or receiver, to standard telephone lines through the transmitter assembly (mouthpiece end) of a standard telephone handset.

An object of the present invention is to provide a novel adapter for connecting an external electrical device to a telephone line.

A further object of the invention is to provide an adapter for attachment to a standard telephone handset to selectively couple an external electrical device, such as a facsimile transceiver, to standard telephone lines.

A further object of the invention is to provide a telephone adapter which includes a control member, or electrical switch, which is conveniently manipulatable to condition the telephone handset for transmitting voice signals or data signals, such as facsimile information.

A further object of the invention is to provide a telephone adapter which is small, compact and portable, and easily attachable to the telephone handset in a matter of seconds by simply unscrewing the mouthpiece, slipping out the microphone, inserting an attachment, and then reapplying the microphone and mouthpiece.

A still further object is to provide a novel system for selectively coupling a telephone microphone and/or another electrical device to the telephone lines.

These and other objects, which will become apparent as the description proceeds, are attainable from the invention which is herein described for illustrative purposes as embodied in an adapter for coupling facsimile communication equipment to standard telephone lines through the transmitter end of a telephone handset.

Figure 1:
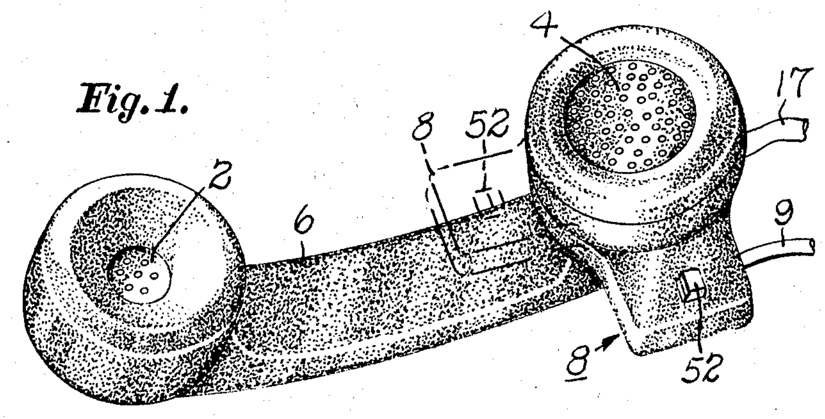
FIG. 1 is a perspective view of a standard telephone handset with the novel telephone adapter attached, the adapter being mounted in the position illustrated in full lines, but being movable to the position shown in broken lines.

FIG. 1 illustrates the novel telephone attachment as applied to the standard telephone handset, which handset includes a receiver sound transducer, namely assembly 2, positionable next to the ear of the user; a transmitter sound transducer, namely assembly 4, positionable next to the mouth of the user; and an interconnecting handle 6. The novel telephone adapter is designated as 8, and, as shown in FIG. 1, it is attachable to the transmitter end 4 of the handset. FIG. 1 illustrates in full lines the adapter 8 as extending perpendicularly to the longitudinal axis of the handset, and in broken lines as extending parallel to the longitudinal axis of the handset. It is applied so as to be pivotal to either position, the former position being usually used when the telephone handset is at rest on its receiver cradle, and the latter position being usually used when the handset is utilized for the transmission of data from the external electrical device, such as the facsimile transmitter, and/or voice signals by the user.

Figure 2:
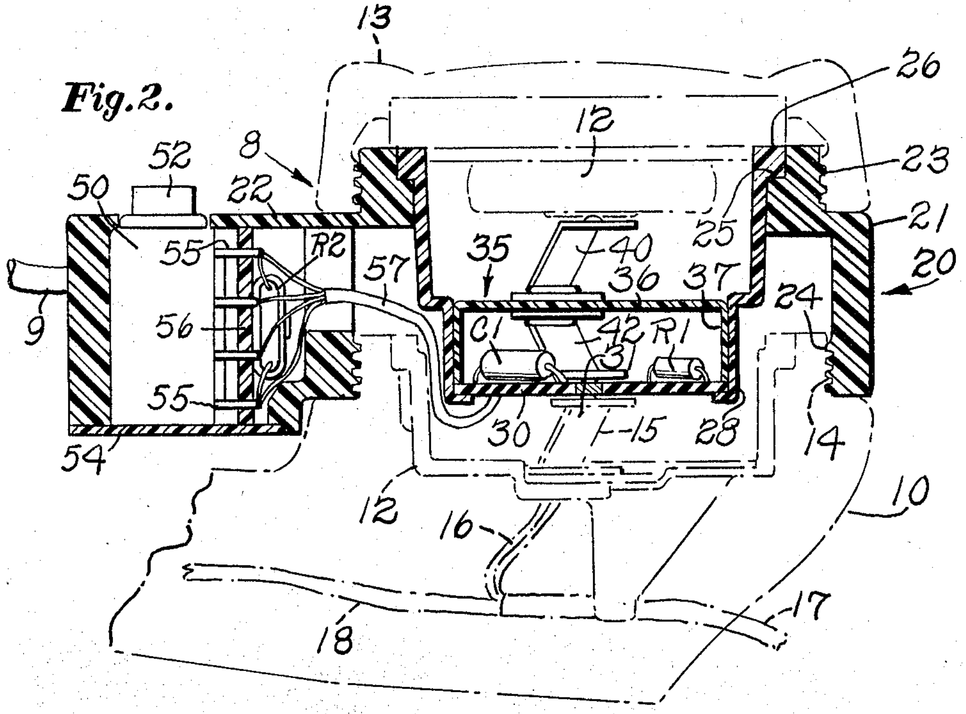
FIG. 2 is a sectional view of the novel adapter attached to the transmitter assembly end of the telephone handset, the novel adapter being in the broken line position of FIG. 1, and the standard telephone parts being shown in broken lines.
Figures 3, 4, 5:
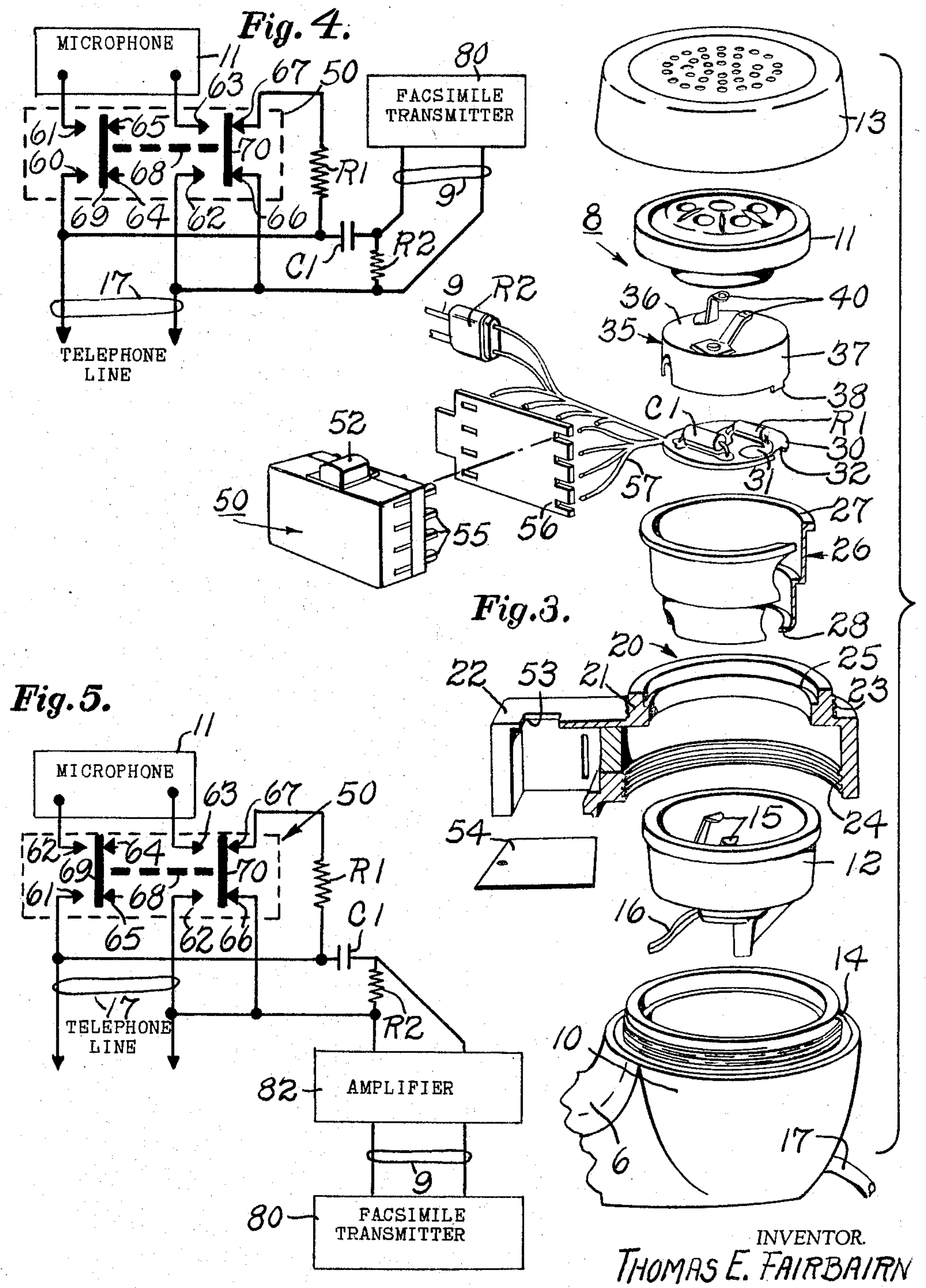
FIG. 3 is an exploded perspective view of the several parts of the structure shown in FIG. 2.
FIG. 4 is a schematic diagram of the electrical circuit of the adapter with respect to that of the transmitter end of the standard telephone handset.
FIG. 5 is a schematic diagram of an alternative electrical circuit.

FIGS. 2 and 3 illustrate the elements which are included in the transmitter end of the handset and in the novel adapter of the present invention, the adapter 8 being shown in FIG. 2 in the broken line position of FIG. 1, that is, parallel to the longitudinal axis of the handset.

The standard parts of the conventional transmitter assembly of the handset (shown in broken lines in FIG. 2) include housing 10, a transmitter or microphone 11, a receptacle 12 for the microphone, and a mouthpiece 13. The mouthpiece 13 is internally threaded and is receivable on threaded annular rim 14 of housing 10 so that microphone 11 is conductively connected to a pair of electrical contacts 15 disposed within receptacle 12. Contacts 15 are in turn connected to electric wires 16 serving as the electrical output for the transmitter assembly of the handset. Wires 16 are connected to an output cable 17, this cable also including electric wires 18 from the receiver assembly of the handset.

The novel telephone adapter 8 is attachable to the transmitter end of the assembly and is positionable between housing 10 and mouthpiece 13, with microphone 11 disposed between it and the mouthpiece. It is provided with a tap or output line 9 for connecting the standard telephone lines to an external electrical device, such as facsimile transmitter 80 (FIGS. 4 or 5), which thereby enables the telephone lines to be used for transmitting the facsimile signals.

The novel adapter includes a housing 20 comprising a generally cylinderical section 21 and a generally rectangular section 22. Section 21 is formed with external threads 23 and internal threads 24 adapted to cooperate, respectively, with the internal threads of mouthpiece 13 and the external threads 14 of housing 10. Section 20 includes many of the circuit components and elements of the adapter, and section 22 includes other components and the control element, or electrical switch, used for selectively controlling the adapter with respect to the microphone and the facsimile unit to be connected to the telephone lines.

Housing section 21 is formed with an internal shoulder 25 adapted to support a cup-shaped element 26, the latter having an out-turned annular rim 27 seatable on shoulder 25. The lower end of element 26 is formed with an inturned rim 28 for receiving a disc 30 on which are mounted two of the electrical components contained in the adapter, namely a resistor R1 and a capacitor C1. Disc 30 is also provided with a pair of contacts 31 connected to these components. Further, disc 30 is formed with a pair of notches 32.

Also disposed within cylindrical section 21 of the housing 20 is a cap 35 including a top plate 36 and a depending skirt 37 formed with tangs 38 receivable in the notches 32 of disc 30 when the cap is assembled within the housing. The top plate 36 of cap 35 carries a pair of upwardly-extending contacts 40 engageable with the contacts of microphone 11, and a pair of downwardly-extending contacts 42 (one shown in FIG. 2) engageable with contacts 31 of disc 30. Disc 30 is also provided with contacts on its lower surface engageable with contacts 15 of receptacle 12 in the standard telephone handset.

Rectangular section 22 of the housing 20 is formed integrally with section 21 and contains the remaining elements of the adapter. Section 22 houses a push-button switch assembly 50 including a push-button 52 projecting through an opening 53 in the upper wall of section 22. The bottom of section 22 is closed by a plate 54. Switch 50 includes a plurality of terminals 55 which pass through a separator plate 56 and are connectible to a plurality of leads 57. The latter leads extend through section 22 of the housing to section 21 and are there connected to the disc 30 where they are included in the electrical circuit of the components carried by the disc.

The leads 57 are connected through impedance matching resistor R2 to the line or tap 9 coupled to the facsimile transmitter 80 (FIGS. 4 or 5).

One form of electrical circuit is schematically illustrated in FIG. 4. As shown, switch 50 includes a first pair of normally open contacts 60 and 61 and a second pair of normally open contacts 62 and 63. The first pair of contacts 60 and 61 are disposed opposite a pair of dummy contacts 64 and 65, and the second pair of contacts 62 and 63 are disposed opposite a further pair of contacts 66 and 67. A movable contactor 68, which is actuated upon depression of the push button 52, carries a bridging contact 69 which normally rests against dummy contacts 64 and 65 but is adapted to bridge the first pair of contacts 60 and 61 when the switch is actuated. Contractor 68 also carries a second bridging contact 70 which normally bridges contacts 66 and 67, but is movable to bridge contacts 62 and 63 when the switch is actuated.

Resistor R1 is connected across the telephone line and is in series with contacts 66 and 67 for a purpose to be later described. Capacitor C1 is connected in series with the telephone line and the facsimile transmitter 80 to isolate the D.C. voltages, and impedance matching resistor R2 is connected directly across the line 9 leading to the facsimile transmitter.

As shown from the circuit connections of FIG. 4, in the normal position of the switch 50 the telephone line 17 will be directly connected to the line 9 leading to the facsimile transmitter 80 through capacitor C1, isolating the D.C. voltages, and impedance matching resistor R2. The microphone 11 is not connected in this circuit. Accordingly, the user would not be able to transmit voice signals during this position of switch 50. However, if the user desires to speak over the telephone at the time the adapter is connected, he would depress push-button 52 of switch 50. This would cause movable contact 69 to bridge contacts 61 and 62, and movable contact 70 to bridge contacts 62 and 63. The microphone 11 would thereby be connected in parallel with the facsimile transmitter to the telephone lines, and the user would be able to speak over the phone.

The purpose of resistor R1 is to provide a load on the telephone line to prevent long distance drop out when the microphone 11 is not in the circuit. This resistor is not required when the microphone is in the circuit, but is required when the microphone is disconnected. Its impedance should be the same as the impedance of the microphone. As shown from the circuit connections in FIG. 4, resistor R1 being connected to contacts 66 and 67 which are bridged by contact 70 in the normal position of the switch, will be in the circuit across the line during the normal position of the switch when facsimile signals are being transmitted. However, when the switch is actuated to connect the microphone to the telephone line, bridging contact 70 moves into engagement with contacts 62 and 63 and thereby removes resistor R1 from the circuit.

Switch 50 is preferably a monostable device, that is, it normally assumes one position, and if actuated to its second position, it will return to its normal position when the action is ended. The stable position of the switch is that shown in FIG. 4, where it bridges contact 66 with contact 67, and dummy contacts 64 and 65, thereby connecting the facsimile transmitter 80 to the telephone line. The switch is connected in a "push-to-talk" arrangement.

That is, upon depression of push-button 52, the switch is actuated as described above to connect the microphone to the telephone line, but as soon as push-button 52 is released, the switch returns to its normal position disconnecting the microphone.

In this manner, when the adapter is attached to the telephone handset, the latter is conditioned for transmitting the data or fasimile signals from facsimile transmitter 80. However, if the operator wishes to speak over the telephone line, he will be able to do this by depressing push-button 52 of switch 50. Normally, this would be done before and/or after he has completed the transmission of data signals from the facsimile transmitter.

The arrangement of the adapter 8 on the telephone handset is such that the user can conveniently depress and hold-down push-button 52 as he speaks into the mouthpiece. For this purpose, the adapter is positioned as shown in the dotted lines of FIG. 1 so that its longitudinal axis is parallel to the longitudinal axis of the telephone handset, this arrangement permitting the convenient manipulation of push-button 52. When transmission is completed, the user may pivot the adapter so that its longitudinal axis is perpendicular to that of the telephone, to permit the handset to be placed on its receiver cradle.

In a typical circuit as illustrated in FIG. 4, impedance matching resistor R2 could have a value of 600 ohms, ⅛ watt; D.C. isolating capacitor could have a value of 1 mfd, 100 v. D.C.; and resistor R1 should have a D.C. resistance equal to the telephone microphone.

FIG. 5 illustrates an alternative embodiment of electrical circuitry that could be used. This embodiment is identical to that of FIG. 4 except that an amplifier 82 is inserted in the circuit to amplify the signals from the facsimile transmitter, if that is necessary or desirable. The amplifier preferably should be a solid-state type, easily carried within housing 20 of the adapter.

It is thus seen that the invention provides an adapter which is small, compact and portable, and which is easily attachable to the telephone handset in a matter of seconds. All that is required is to unscrew the mouthpiece 13, remove microphone 11, screw the adapter on threads 14 of the telephone housing 10, re-insert the microphone 11 so that it engages contacts 40 and 42 of the adapter, and then rescrew mouthpiece 13. Because of its small and compact nature, the adapter may be easily carried on the person of a user and may be applied to any telephone to which the user has access. A person having such an adapter may thus avail himself of the standard telephone lines for transmitting data from any remote location where a telephone handset is available to any other location also having a telephone handset.

While the invention has been described with respect to preferred embodiments thereof, it will be understood that features thereof, singly or in combination, may be used in other applications or may be modified within the spirit and scope of the invention as defined in the following claims.

I claim:

1. In combination, a telephone transmitter including a microphone and a telephone line; a facsimile transmitter; an impedance of the same value as said microphone; an amplifier; and an electrical switch actuatable from one position connecting said impedance, said amplifier and said facsimile transmitter to said telephone line, to another position connecting said microphone, said amplifier and said facsimile transmitter to said telephone line.

2. For use in a system comprising a facsimile transmitter and a telephone handset including a threadedly applied mouthpiece, a microphone, and a telephone line, an adapter connectible to said telephone handset, said adapter comprising: a housing formed with threads for receiving said mouthpiece thereover with said microphone therebetween; a tap for connection to said facsimile transmitter; an impedance of the same value as said microphone, said impedance being disposed within said housing; and an electrical switch within said housing and including a member projecting from said housing and actuatable from one position connecting said impedance and said tap to said telephone line, to another position connecting said microphone and said tap to said telephone line.

3. An adapter attachable to a telephone handset including a microphone connected to a telephone line, comprising: a housing attachable to said telephone handset; a tap for connection to an external electrical device; an impedance of the same value as the microphone of the handset, said impedance being disposed within said housing; and an electrical switch within said housing and including a member projecting from said housing and movable from one position connecting said impedance and said tap to the telephone line, to another position connecting the microphone and said tap to the telephone line.

References Cited by the Examiner

UNITED STATES PATENTS

| | | | |
|---|---|---|---|
| 610,393 | 9/1898 | Fisher | 179—81 |
| 2,191,993 | 2/1940 | McLarn | 179—103 |
| 2,209,326 | 7/1940 | D'Humy et al. | 178—5.6 |
| 2,245,835 | 6/1941 | Stehlik | 179—103 |
| 2,268,665 | 1/1942 | Loewe | 179—1 |
| 2,503,846 | 4/1950 | Shann | 179—103 |
| 2,820,846 | 1/1958 | Hansen et al. | 179—1 |

FOREIGN PATENTS

| | | |
|---|---|---|
| 516,991 | 1/1940 | Great Britain. |

KATHLEEN H. CLAFFY, *Primary Examiner.*

W. L. LYNDE, ROBERT H. ROSE, *Examiners.*

H. BOOHER, H. ZELLER, *Assistant Examiners.*